(12) United States Patent
Kamei et al.

(10) Patent No.: US 9,873,788 B2
(45) Date of Patent: Jan. 23, 2018

(54) COMPOSITION AND SURFACE PROTECTION FILM

(71) Applicant: Asahi Kasei Kabushiki Kaisha, Tokyo (JP)

(72) Inventors: Yuta Kamei, Tokyo (JP); Toshikazu Hoshina, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/129,991

(22) PCT Filed: Apr. 7, 2015

(86) PCT No.: PCT/JP2015/060875
§ 371 (c)(1),
(2) Date: Sep. 28, 2016

(87) PCT Pub. No.: WO2015/156289
PCT Pub. Date: Oct. 15, 2015

(65) Prior Publication Data
US 2017/0145206 A1    May 25, 2017

(30) Foreign Application Priority Data
Apr. 8, 2014    (JP) .................................. 2014-079719

(51) Int. Cl.
*C08L 53/02* (2006.01)
*C08F 297/04* (2006.01)

(52) U.S. Cl.
CPC .......... *C08L 53/025* (2013.01); *C08F 297/04* (2013.01); *C08L 2203/16* (2013.01); *C08L 2205/025* (2013.01)

(58) Field of Classification Search
CPC .... C08F 297/04; C08L 2205/25; C08L 53/02; C08L 53/025; C08L 2203/16
See application file for complete search history.

(56) References Cited

U.S. PATENT DOCUMENTS

| 2005/0107521 A1 | 5/2005 | Sasagawa et al. |
| 2007/0179220 A1 | 8/2007 | Sasagawa et al. |
| 2010/0015442 A1 | 1/2010 | Shimoura et al. |
| 2011/0034614 A1* | 2/2011 | Nakajima ............ C08L 53/025 524/505 |
| 2011/0319549 A1 | 12/2011 | Oda et al. |

FOREIGN PATENT DOCUMENTS

| JP | H05-093176 A | 4/1993 |
| JP | H07-116410 B2 | 12/1995 |
| JP | H08-073699 A | 3/1996 |
| JP | 2005-126485 A | 5/2005 |
| JP | 4115791 B2 | 7/2008 |
| JP | 2008-274212 A | 11/2008 |
| JP | 2008274212 A * | 11/2008 |
| JP | 2010-024275 A | 2/2010 |
| JP | 2010-235772 A | 10/2010 |
| WO | 2007/126081 A1 | 11/2007 |
| WO | 2009/128397 A1 | 10/2009 |
| WO | 2010/018743 A1 | 2/2010 |
| WO | WO 2010018743 A1 * | 2/2010 ................ C08F 8/04 |
| WO | 2010/113883 A1 | 10/2010 |

OTHER PUBLICATIONS

International Search Report issued in corresponding International Patent Application No. PCT/JP2015/060875 dated Jun. 16, 2015.
Supplementary European Search Report issued in counterpart European Patent Application No. 15776754.2 dated Mar. 31, 2017.
International Preliminary Report on Patentability issued in corresponding International Patent Application No. PCT/JP2015/060875 dated Oct. 12, 2016.

* cited by examiner

*Primary Examiner* — Mark Kaucher
(74) *Attorney, Agent, or Firm* — Morgan, Lewis & Bockius LLP

(57) ABSTRACT

A composition comprising: a hydrogenated block copolymer (1) comprising a block A mainly comprising a vinyl aromatic compound monomer unit and a block B mainly comprising a conjugated diene monomer unit, wherein the conjugated diene monomer unit has an amount of vinyl bonds of 50% or more before hydrogenation; and a hydrogenated copolymer (2) comprising a block C randomly comprising a vinyl aromatic compound monomer unit and a conjugated diene monomer unit, and having a degree of hydrogenation of double bonds based on the conjugated diene monomer unit of 90% or more.

16 Claims, No Drawings

COMPOSITION AND SURFACE PROTECTION FILM

TECHNICAL FIELD

The present invention relates to a composition and a surface protection film.

BACKGROUND ART

To date, acrylic tackifiers, and rubber-based tackifiers mainly containing rubbers such as natural rubber and polyisobutylene, are primarily used as tackifiers for the adhesive layer of a surface protection film. Methods involving a roll, spray, or the like to apply a tackifier solution in which a tackifier is dissolved in a solvent are used as methods for applying such a tackifier to a predetermined support film. Although such methods are capable of forming the tackifier layer uniformly and thinly and are thus advantageous, the use of a solvent is not preferable from the viewpoint of air pollution, fire, safety and health during production, economy, and so on.

On the other hand, as a production technique for a hot-melt-type surface protection film for which solvents are not used, a technique that produces a laminate of a tackifier layer and a support film by coextrusion is known, and concerning tackifiers as well, various hot-melt tackifiers have been developed (see, for example, Patent Literature 1). As a tackifier having excellent tack strength, a tacky composition has been proposed that is composed of an epoxy-modified hydrogenated block copolymer composed of a block mainly including a vinyl aromatic compound and a block mainly including a conjugated diene, wherein some double bonds of conjugated diene portions are hydrogenated, and the rest of the double bonds are partially epoxidized (see, for example, Patent Literature 2).

Furthermore, a coextruded film has been proposed in which a tackifier layer is made of a copolymer mainly including ethylene such as EVA and having a high level of affinity to olefinic resin films in the case of using as a support film an olefinic resin film that is a typical material to which adhesives are unlikely to adhere (see, for example, Patent Literature 3).

CITATION LIST

Patent Literature

Patent Literature 1
  Japanese Patent No. 4115791
Patent Literature 2
  Japanese Patent Laid-Open No. 8-73699
Patent Literature 3
  Japanese Patent Publication No. 7-116410

SUMMARY OF INVENTION

Technical Problem

However, the technique for producing a surface protection film by the coextrusion of a laminate of a viscous adhesive layer and a support film as in Patent Literature 1 is problematic because it is difficult to perform effective means for increasing the tack strength between the support film and the viscous adhesive layer, such as corona treatment, alkali treatment, and flame treatment, on the surface of the support film, and a coextruded film having a high level of tack strength is therefore unlikely to be obtained. Specifically, in the case where a laminate of a support film and a viscous adhesive layer is attached to a metal plate or the like, there is a problem that boundary separation is likely to occur between the support film and the viscous adhesive layer, resulting in an adhesive residue.

The tacky composition disclosed in Patent Literature 2 undergoes severe gelation and deterioration due to heat or long-term storage, and thus has a problem that should be solved with respect to long-term stability.

Furthermore, Patent Literature 3 also discloses, for example, an adhesive film for surface protection in which a viscous adhesive layer of A-B-A block copolymer (where A is a styrene polymer block, and B is an ethylene/butylene copolymer block) is formed on an olefinic resin film. However, there are the following problems: this viscous adhesive fails to provide good adhesion when adherends are warped or have a complex shape, and on the other hand, when the viscous adhesive is attached to adherends having a smooth surface, bonding strength changes due to long-term storage, and an adhesive residue appears when the film is peeled off. Once a surface protection film having excessive tackiness is attached to an adherend, such a surface protection film is likely to yield an adhesive residue on the adherend when the film is peeled off, and excessively low tackiness results in poor workability.

The present invention has been conceived in view of the above-described problems of conventional art, and an object of the present invention is to provide a composition and a surface protection film comprising such a composition, that have excellent adhesion to adherends, demonstrate practically good initial tack strength, are unlikely to undergo a change over time in bonding strength even when adhered for a long period of time, and can be easily peeled off at any time.

Solution to Problem

In order to solve the above problems, the inventors conducted diligent research and, as a result, found that a composition comprising a specific hydrogenated block copolymer (1) and hydrogenated copolymer (2) effectively solves the above problems, and accomplished the present invention.

That is to say, the present invention is as set forth below.

[1]
  A composition comprising:
  a hydrogenated block copolymer (1) comprising a block A mainly comprising a vinyl aromatic compound monomer unit and a block B mainly comprising a conjugated diene monomer unit, wherein the conjugated diene monomer unit has an amount of vinyl bonds of 50% or more before hydrogenation; and
  a hydrogenated copolymer (2) comprising a block C randomly comprising a vinyl aromatic compound monomer unit and a conjugated diene monomer unit, and having a degree of hydrogenation of double bonds based on the conjugated diene monomer unit of 90% or more.

[2]
  The composition according to [1], wherein
  the hydrogenated block copolymer (1) has a content of the vinyl aromatic compound monomer unit of 5 to 30 mass %, and
  the hydrogenated copolymer (2) has a content of the vinyl aromatic compound monomer unit of 40 to 80 mass %.

[3]
The composition according to [1] or [2], wherein the hydrogenated block copolymer (1) has a degree of hydrogenation of double bonds based on the conjugated diene monomer unit of 90% or more.

[4]
The composition according to any one of [1] to [3], wherein the hydrogenated copolymer (2) has a degree of hydrogenation of double bonds based on the conjugated diene monomer unit of 93% or more.

[5]
The composition according to any one of [1] to [4], wherein the hydrogenated block copolymer (1) has a melt flow rate (g/10 min) of 1.0 to 30 at a temperature of 230° C. under a load of 2.16 kg.

[6]
The composition according to any one of [1] to [5], wherein the hydrogenated copolymer (2) further comprises the block A mainly comprising a vinyl aromatic compound monomer unit.

[7]
The composition according to [6], wherein the hydrogenated copolymer (2) has a block A content of 5.0 to 30 mass %.

[8]
The composition according to any one of [1] to [7], wherein the conjugated diene monomer unit of the hydrogenated copolymer (2) has an amount of vinyl bonds of less than 50% before hydrogenation.

[9]
The composition according to any one of [1] to [8], wherein the conjugated diene monomer unit of the hydrogenated copolymer (2) has an amount of vinyl bonds of 20% or more and less than 50% before hydrogenation.

[10]
The composition according to any one of [1] to [9], wherein the hydrogenated copolymer (2) has only one loss tangent peak top in a range of −70 to 50° C. in a dynamic viscoelasticity spectrum.

[11]
The composition according to any one of [1] to [10], wherein the hydrogenated block copolymer (1) has a weight average molecular weight of more than 100,000.

[12]
The composition according to any one of [1] to [11], wherein a mass ratio of the hydrogenated block copolymer (1) to the hydrogenated copolymer (2) is 95-5 to 5-95.

[13]
The composition according to any one of [1] to [12], further comprising a hydrogenated copolymer (3) having a weight average molecular weight 0.30 to 0.70 times that of the hydrogenated copolymer (2).

[14]
The composition according to [13], wherein a conjugated diene monomer unit of the hydrogenated copolymer (3) has an amount of vinyl bonds of less than 50% before hydrogenation.

[15]
A composition comprising 0 to 100 parts by mass of a tackifier based on 100 parts by mass of the composition according to any one of [1] to [14].

[16]
A surface protection film comprising the composition according to any one of [1] to [15].

Advantageous Effect of the Invention

The present invention provides a composition and a surface protection film containing the composition, that have excellent adhesion to adherends, demonstrate practically good initial tack strength, are unlikely to undergo a change over time in bonding strength even when adhered for a long period of time, and can be easily peeled off at any time.

DESCRIPTION OF EMBODIMENT

Below, an embodiment for carrying out the present invention (hereinafter simply referred to as "the present embodiment") will now be described in detail. The present invention is not limited to the following embodiment, and can be carried out after making various modifications within the scope of the present invention.

[Composition]

The composition of the present embodiment comprises a hydrogenated block copolymer (1) comprising a block A mainly comprising a vinyl aromatic compound monomer unit and a block B mainly comprising a conjugated diene monomer unit, wherein the conjugated diene monomer unit has an amount of vinyl bonds of 50% or more before hydrogenation; and a hydrogenated copolymer (2) comprising a block C randomly comprising a vinyl aromatic compound monomer unit and a conjugated diene monomer unit, and having a degree of hydrogenation of double bonds based on the conjugated diene monomer unit of 90% or more. Due to this configuration, the composition of the present embodiment has excellent adhesion to adherends, demonstrates practically good initial tack strength, is unlikely to undergo a change over time in bonding strength even when adhered for a long period of time, and can be easily peeled off at any time.

In the present embodiment, each monomer unit constituting the block copolymer is named after the monomer from which the monomer unit is derived. For example, the "vinyl aromatic compound monomer unit" means a constitutional unit of a polymer produced as a result of polymerizing a monomer vinyl aromatic compound, and has a molecular structure in which two carbon atoms of a substituted ethylene group derived from a substituted vinyl group serve as bonding sites.

Moreover, the "conjugated diene monomer unit" means a constitutional unit of a polymer produced as a result of polymerizing a monomer conjugated diene, and has a molecular structure in which two carbon atoms of an olefin derived from the conjugated diene monomer serve as bonding sites.

Herein, the phrase "mainly comprising" means that a monomer unit is contained in an amount of more than 75 mass % in a polymer block. The monomer unit is preferably contained in an amount of 80 mass % or more, preferably contained in an amount of 85 mass % or more, more preferably contained in an amount of 90 mass % or more, and even more preferably in an amount of 95 mass % or more.

Examples of the "vinyl aromatic compound monomer" include, but are not limited to, vinyl aromatic compounds such as styrene, a-methylstyrene, p-methylstyrene, divinylbenzene, 1,1-diphenylethylene, N,N-dimethyl-p-aminoethylstyrene, and N,N-diethyl-p-aminoethylstyrene. These may be used singly, and two or more may be used in combination.

The "conjugated diene monomer" is a diolefin having a pair of conjugated double bonds, and examples thereof include, but are not limited to, 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. In particular, 1,3-butadiene and isoprene are preferable. These may be used singly, and two or more may be used in combination. In the case of using 1,3-butadiene and isoprene, it is preferable to mainly use 1,3-butadiene from the viewpoint of imparting high mechanical strength to the composition of the present embodiment. The 1,3-butadiene content in the conjugated diene is preferably 80 mass % or more, more preferably 90 mass % or more, and even more preferably 95 mass % or more.

(Hydrogenated Block Copolymer (1))

Concerning the microstructure of the conjugated diene monomer unit constituting the hydrogenated block copolymer (1) in the present embodiment, the amount of vinyl bonds of the conjugated diene monomer unit is 50% or more, preferably 60% or more, and 70% or more before hydrogenation. Although the upper limit is not particularly specified, the amount of vinyl bonds is preferably 95% or less, and more preferably 90% or less. The amount of vinyl bonds refers to the proportion of conjugated diene monomer units incorporated as 1,2-bonds and 3,4-bonds in the block copolymer among the conjugated diene monomer units incorporated as 1,2-bonds, 3,4-bonds, and 1,4-bonds. When the conjugated diene monomer unit has an amount of vinyl bonds of less than 50% before hydrogenation, the composition of the present embodiment after being adhered for a long period of time exhibits greatly changed bonding strength, thus making it difficult to peel off the composition and causing an adhesive residue, and therefore such an amount is not preferable. The amount of vinyl bonds of the conjugated diene monomer unit can be controlled, for example, by adjusting the amount of a tertiary amine compound or an ether compound added when the conjugated diene compound monomer and the vinyl aromatic hydrocarbon compound monomer are copolymerized. Examples of the tertiary amine compound include, but are not limited to, N,N,N',N'-tetramethylethylenediamine (TMEDA) and the like. The microstructure of the conjugated diene monomer unit can be analyzed with a nuclear magnetic resonator (NMR) or the like. Specifically, the microstructure can be analyzed by the method described in the Examples below.

The content of the vinyl aromatic compound monomer unit of the hydrogenated block copolymer (1) in the present embodiment is preferably in the range of 5.0 to 30 mass %, more preferably in the range of 10 to 25 mass %, and even more preferably in the range of 13 to 20 mass %. The content of the conjugated diene monomer unit of the hydrogenated block copolymer (1) is preferably in the range of 70 to 95 mass %, more preferably in the range of 75 to 90 mass %, and even more preferably in the range of 80 to 87 mass %. When the content of the vinyl aromatic compound monomer unit is 30 mass % or less, the composition tends to have better tackiness. On the other hand, when the content is 5 mass % or more, there is a tendency that excessive tackiness can be effectively prevented, and an adhesive residue is less likely to appear on an adherend when the attached film is peeled off, and therefore such a content is preferable. The content of the vinyl aromatic compound monomer unit of the hydrogenated copolymer (1) of the present embodiment can be measured by the method described in the Examples below. The content of the vinyl aromatic compound monomer unit is nearly identical before and after hydrogenation, and therefore the vinyl aromatic compound content in the copolymer before hydrogenation may be understood.

The degree of hydrogenation of double bonds based on the conjugated diene monomer of the hydrogenated block copolymer (1) in the present embodiment is preferably 90% or more, more preferably 92% or more, and even more preferably 94% or more. Although the upper limit is not particularly specified, the degree of hydrogenation is preferably 100% or less, and more preferably 99% or less. When the degree of hydrogenation is 90% or more, there is a tendency that the tack strength of the composition can be sufficiently ensured, and practically better initial adhesion can be demonstrated. The degree of hydrogenation can be controlled, for example, by adjusting the amount of a hydrogenation catalyst, which will be described below. The degree of hydrogenation can be measured by the method described in the Examples below.

The melt flow rate (g/10 min) of the hydrogenated block copolymer (1) in the present embodiment is preferably in the range of 1.0 to 30, more preferably in the range of 5.0 to 25, and even more preferably in the range of 10 to 20 at a temperature of 230° C. under a load of 2.16 kg. When the melt flow rate (g/10 min) is 1.0 or more at a temperature of 230° C. under a load of 2.16 kg, there is a tendency that the melt viscosity, which will be described below, of the composition of the present embodiment is lower, and the fabricability is more improved. When the melt flow rate (g/10 min) is 30 or less, there is a tendency that sufficient tack strength can be ensured and, as will be described below, once the tacky layer of a surface protection film is formed with the composition of the present embodiment, the amount of adhesive residue can be more reduced when the surface protection film is peeled off, and therefore such a melt flow rate is preferable. The melt flow rate can be measured by the method described in the Examples below.

The weight average molecular weight of the hydrogenated block copolymer (1) in the present embodiment is preferably more than 100,000, more preferably more than 100,000 and 250,000 or less, and even more preferably 110,000 to 230,000. When the weight average molecular weight is more than 100,000, there is a tendency that the melt flow rate does not become excessively high, and the amount of adhesive residue can be smaller when a surface protection film is peeled off, and therefore such a weight average molecular weight is preferable. When the weight average molecular weight is 250,000 or less, there is a tendency that the melt viscosity, which will be described below, of the composition of the present embodiment is lower, and the fabricability is more improved. The weight average molecular weight can be measured by the method described in the Examples below.

(Hydrogenated Copolymer (2) and Hydrogenated Copolymer (3))

The hydrogenated copolymer (2) and/or the hydrogenated copolymer (3), which will be described below, in the present embodiment comprises a block C randomly comprising a vinyl aromatic compound monomer unit and a conjugated diene monomer unit. Moreover, the degree of hydrogenation of double bonds based on the conjugated diene monomer of the hydrogenated copolymer (2) in the present embodiment is 90% or more, more preferably 92% or more, even more preferably 93% or more, and yet more preferably 94% or more. Although the upper limit is not particularly specified, the degree of hydrogenation is preferably 100% or less, and more preferably 99% or less. When the degree of hydrogenation is less than 90%, the tack strength of the composition is insufficient, and practically good initial adhesion cannot be demonstrated, and therefore such a degree of hydrogenation is not preferable. The degree of hydrogenation can be controlled by adjusting the amount of a hydrogenation catalyst, which will be described below. The degree of hydrogenation can be measured by the method described in the Examples below.

The content of the vinyl aromatic compound monomer unit of the hydrogenated copolymer (2) and/or the hydrogenated copolymer (3), which will be described below, in the present embodiment is preferably in the range of 40 to 80 mass %, more preferably in the range of 44 to 75 mass %, and even more preferably in the range of 48 to 70 mass %. The content of the conjugated diene monomer unit of the hydrogenated copolymer (2) is preferably in the range of 20 to 60 mass %, more preferably in the range of 25 to 56 mass %, and even more preferably in the range of 30 to 52 mass %. When the content of the vinyl aromatic compound monomer unit is 80 mass % or less, the composition tends to have more improved tackiness. On the other hand, when the content is 40 mass % or more, there is a tendency that excessive tackiness can be effectively prevented, and an adhesive residue is less likely to appear on an adherend when the attached film is peeled off, and therefore such a content is preferable. It is particularly preferable that the content of the vinyl aromatic compound monomer unit in the hydrogenated block copolymer (1) is 5.0 to 30 mass %, and the content of the vinyl aromatic compound monomer unit in the hydrogenated copolymer (2) is 40 to 80 mass %. The content of the vinyl aromatic compound monomer unit of the hydrogenated copolymer of the present embodiment can be measured by the method described in the Examples below. The content of the vinyl aromatic compound monomer unit is nearly identical before and after hydrogenation, and therefore the vinyl aromatic compound content in the copolymer before hydrogenation may be understood.

The hydrogenated copolymer (2) and/or the hydrogenated copolymer (3), which will be described below, in the present embodiment comprises at least one block C randomly comprising a vinyl aromatic compound monomer unit and a conjugated diene monomer unit, and, in addition, it is preferable from the viewpoint of obtaining practically good initial tack strength and reducing the change over time in bonding strength that the hydrogenated copolymer (2) and/or the hydrogenated copolymer (3) further comprises the block A mainly comprising a vinyl aromatic compound monomer unit. Here, the vinyl aromatic compound monomer unit and the conjugated diene monomer unit in the block C may be uniformly distributed or may be distributed in a tapered manner.

The content of the vinyl aromatic compound monomer unit in the block C is preferably 25 mass % or more and 75 mass % or less, more preferably 30 mass % or more and 70 mass % or less, and even more preferably 35 mass % or more and 65 mass % or less. The content of the conjugated diene monomer unit in the block C is preferably 25 mass % or more and 75 mass % or less, more preferably 30 mass % or more and 70 mass % or less, and even more preferably 35 mass % or more and 65 mass % or less. In the case of comprising the block A mainly comprising a vinyl aromatic compound monomer unit, the block A content in the hydrogenated copolymer (2) is preferably in the range of 5.0 to 30 mass %, more preferably in the range of 8.0 to 28 mass %, and even more preferably in the range of 10 to 25 mass %. When the block A content in the hydrogenated copolymer (2) is 5 mass % or more, there is a tendency that excessive tackiness can be effectively prevented, the hydrogenated copolymer (2) is easily maintained as particles, and particles are unlikely to aggregate with each other. Accordingly, there is a tendency that the hydrogenated copolymer (2) is easily supplied in specific quantities when preparing the composition of the present embodiment, and therefore such a block A content is preferable. A content of 30 mass % or less tends to result in better adhesion to adherends and is thus preferable. The block A content in the hydrogenated copolymer (2) in the present embodiment can be measured by the method described in the Examples below.

Concerning the hydrogenated copolymer (2) and/or the hydrogenated copolymer (3) of the present embodiment, the amount of vinyl bonds of the conjugated diene monomer unit is preferably less than 50%, more preferably 20% or more and less than 50%, and even more preferably 20% or more and 45% or less before hydrogenation. When the amount of vinyl bonds is less than 50%, the composition tends to have better tackiness, and therefore such an amount is preferable. When the amount of vinyl bonds is 20% or more, the composition tends to demonstrate good adhesion, and therefore such an amount is preferable. The amount of vinyl bonds of the conjugated diene monomer unit can be controlled, for example, by adjusting the amount of a tertiary amine compound or an ether compound added when the conjugated diene compound monomer and the vinyl aromatic hydrocarbon compound monomer are copolymerized. The microstructure of the conjugated diene monomer unit can be analyzed with a nuclear magnetic resonator (NMR) or the like. The amount of vinyl bonds of the conjugated diene monomer unit and the content of the vinyl aromatic compound monomer unit can be measured by the methods described in the Examples below.

It is preferable that the hydrogenated copolymer (2) and/or the hydrogenated copolymer (3), which will be described below, in the present embodiment has only one loss tangent peak top in the range of −70 to 50° C., more preferably only one loss tangent peak top in the range of −60 to 40° C., and even more preferably only one loss tangent peak top in the range of −50 to 30° C., in a dynamic viscoelasticity spectrum. When the loss tangent peak top is at −70° C. or higher, the composition tends to have better adhesion to adherends, and therefore such a loss tangent peak top is preferable. When the loss tangent peak top is at 50° C. or lower, the composition tends to demonstrate practically good initial tack strength, and therefore such a loss tangent peak top is preferable. With one peak top in the range of −70° C. to 50° C., the composition tends to have a reduced change over time in bonding strength, which is preferable. The loss tangent peak top in the range of −70 to 50° C. in a dynamic viscoelasticity spectrum is a peak, which will be described below, resulting from the block B and the block C and can be adjusted by controlling the content of the vinyl aromatic compound monomer unit, the amount of vinyl bonds of the conjugated diene monomer unit before hydrogenation, the degree of hydrogenation of double bonds based on the conjugated diene monomer, and other features of the block C. The loss tangent peak top can be measured by the method described in the Examples below.

The melt flow rate (g/10 min) of the hydrogenated copolymer (2) and/or the hydrogenated copolymer (3), which will be described below, in the present embodiment is preferably in the range of 1.0 to 30, more preferably in the range of 3.0 to 25, and even more preferably in the range of 5.0 to 20 at a temperature of 230° C. under a load of 2.16 kg. When the melt flow rate (g/10 min) is 1.0 or more at a temperature of 230° C. under a load of 2.16 kg, there is a tendency that the melt viscosity, which will be described below, of the composition of the present embodiment is lower, and the fabricability is more improved. When the melt flow rate (g/10 min) is 30 or less, there is a tendency that sufficient tack strength can be ensured and, as will be described below, once the tacky layer of a surface protection film is formed with the composition of the present embodiment, the amount of adhesive residue can be more reduced when the surface protection film is peeled off, and therefore such a melt flow rate is preferable. The melt flow rate can be measured by the method described in the Examples below.

It is preferable that the composition of the present embodiment further comprises the hydrogenated copolymer (3) in addition to the hydrogenated block copolymer (1) and the hydrogenated copolymer (2) from the viewpoint of attaining good formability of a film that is unlikely to undergo a change over time in bonding strength. Here, the hydrogenated copolymer (3) preferably has a weight average molecular weight 0.30 to 0.70 times, more preferably 0.35 to 0.65 times, and even more preferably 0.40 to 0.60 times the weight average molecular weight of the hydrogenated copolymer (2). In the present embodiment, when the weight average molecular weight of the hydrogenated copolymer (3) is no less than 0.30 times the weight average molecular weight of the hydrogenated copolymer (2), the composition tends to have better fabricability. When it is no more than 0.70 times the weight average molecular weight of the hydrogenated copolymer (2), the composition tends to have better tackiness.

The weight average molecular weight of the hydrogenated copolymer (2) is preferably 100,000 to 250,000 and more preferably 120,000 to 230,000. The weight average molecular weight can be measured by the method described in the Examples below.

The hydrogenated copolymer (2) may be contained as a coupling product of the hydrogenated copolymer (3) in the composition of the present embodiment.

In the present embodiment, the structures of the hydrogenated copolymer (2) and the hydrogenated copolymer (3) are not particularly limited except that (2) comprises the block C randomly comprising a vinyl aromatic compound monomer unit and a conjugated diene monomer unit, and the hydrogenated copolymer (2) and the hydrogenated copolymer (3) having any structure are usable. Particularly recommended are hydrogenated products of copolymers having at least one structure represented by a general formula selected from below. The hydrogenated copolymers used in the present embodiment may be any mixture composed of hydrogenated products of copolymers having structures represented by general formulae below. Moreover, a vinyl aromatic compound polymer may be mixed with the hydrogenated copolymers.

C, (A-C)n, A-(C-A)n, C-(A-C)n, [(C-A)n]m-X, [(A-C)n]m-X, [(C-A)n-C]m-X, [(A-C)n-A]m-X, (C-A)n-X-(A)p, (B-C)n, B-(C-B)n, C-(B-C)n, [(B-C)n]m-X, [(C-B)n-C]m-X, [(B-C)n-B]m-X, B-(C-A)n, B-(A-C)n, B-(A-C-A)n, B-(C-A-C)n, A-B-(C-A)n, A-B-(A-C)n, A-B-(C-A)n-C, [(A-C-B)n]m-X, [A-(C-B)n]m-X, [(A-C)n-B]m-X, [(A-C-A)n-B]m-X, [(C-A-C)n-B]m-X, [(B-C-A)n]m-X, [B-(C-A)n]m-X, [B-(A-C-A)n]m-X, [B-(C-A-C)n]m-X (wherein, A is a vinyl aromatic compound polymer block (block A), C is a random copolymer of a conjugated diene and a vinyl aromatic compound or a random copolymer block of a conjugated diene and a vinyl aromatic compound (block C), and B is a conjugated diene polymer block (block B). It is not necessarily required that the boundary between the blocks is clearly distinguishable. Moreover, m is an integer of 2 or greater and preferably an integer of 2 to 10, and n and p are each an integer of 1 or greater and preferably an integer of 1 to 10. X represents a residue of a coupling agent or a polyfunctional initiator residue. In the general formulae, vinyl aromatic hydrocarbons in the random copolymer or the random copolymer block C may be uniformly distributed or may be distributed in a tapered manner. The random copolymer or the random copolymer block C may have a plurality of portions where vinyl aromatic hydrocarbons are uniformly distributed and/or a plurality of portions where vinyl aromatic hydrocarbons are distributed in a tapered manner. The random copolymer or the random copolymer block C may have a plurality of segments having different vinyl aromatic hydrocarbon contents. When there are a plurality of blocks A and a plurality of blocks C in the copolymer, their structures such as molecular weights and compositions may be the same or different. The structures of polymer chains bonded to X may be the same or different.)

The composition of the hydrogenated block copolymer (1) and the hydrogenated copolymer (2) in the tacky composition of the present embodiment is preferably in the range of hydrogenated block copolymer (1)/hydrogenated copolymer (2)=95-5/5-95, more preferably 90-10/10-90, and even more preferably 85-15/15-85 in terms of the mass ratio of the hydrogenated block copolymer (1) to the hydrogenated copolymer (2). From the viewpoint of obtaining practical initial adhesion, the composition is preferably in the range of hydrogenated block copolymer (1)/hydrogenated copolymer (2)=85-55/15-45, and from the viewpoint of a reduced change over time in bonding strength, the composition is preferably in the range of hydrogenated block copolymer (1)/hydrogenated copolymer (2)=45-15/55-85.

When the hydrogenated copolymer (3) is contained, the composition of the hydrogenated block copolymer (1), the hydrogenated copolymer (2), and the hydrogenated copolymer (3) in the tacky composition of the present embodiment is preferably in the range of hydrogenated block copolymer (1)/(hydrogenated copolymer (2)+hydrogenated copolymer (3))=95-5/5-95, more preferably 90-10/10-90, and even more preferably 85-15/15-85. From the viewpoint of obtaining practical initial adhesion, the composition is preferably in the range of hydrogenated block copolymer (1)/(hydrogenated copolymer (2)+hydrogenated copolymer (3))=85-55/15-45, and from the viewpoint of a reduced change over time in bonding strength, the composition is preferably in the range of hydrogenated block copolymer (1)/(hydrogenated copolymer (2)+hydrogenated copolymer (3))=45-15/55-85.

The hydrogenated copolymer (2) content and the hydrogenated copolymer (3) content in the tacky composition are preferably in the range of hydrogenated copolymer (2)/hydrogenated copolymer (3)=3.0-97 parts by mass/97-3.0 parts by mass, more preferably 6.0-94 parts by mass/94-6 parts by mass, and even more preferably 10-90 parts by mass/90-10 parts by mass, based on the total mass of the hydrogenated block copolymer (1), the hydrogenated copolymer (2), and the hydrogenated copolymer (3) being 100 parts by mass.

(Methods for Producing Hydrogenated Block Copolymer (1) and Hydrogenated Copolymers (2) and (3))

Methods for polymerizing the hydrogenated block copolymer (1), the hydrogenated copolymer (2), and the hydrogenated copolymer (3) of the present embodiment are not particularly limited, and examples thereof include coordination polymerization, anionic polymerization, cationic polymerization, and the like. From the viewpoint of ease of structure control, anionic polymerization is preferable.

A known method is applicable to producing the block copolymer by anionic polymerization. Examples thereof include, but are not limited to, those described in Japanese Patent Publication No. 36-19286, Japanese Patent Publication No. 43-17979, Japanese Patent Publication No. 46-32415, Japanese Patent Publication No. 49-36957, Japanese Patent Publication No. 48-2423, Japanese Patent Publication No. 48-4106, Japanese Patent Publication No. 56-28925, Japanese Patent Laid-Open No. 59-166518, and Japanese Patent Laid-Open No. 60-186577.

Examples of methods for hydrogenating conjugated diene portions of the hydrogenated block copolymer (1), the hydrogenated copolymer (2), and the hydrogenated copolymer (3) of the present embodiment include, but are not limited to, methods in which hydrogen is supplied in the presence of a hydrogenation catalyst to hydrogenate unsaturated portions.

The hydrogenation catalyst is not particularly limited, and examples thereof include conventionally known hydrogenation catalysts such as (1) supported heterogeneous hydrogenation catalysts in which metals such as Ni, Pt, Pd, and Ru are supported on carbon, silica, alumina, diatomaceous earth, and the like; (2) so-called Ziegler hydrogenation catalysts in which transition metal salts such as organic acid salts or acetylacetone salts of Ni, Co, Fe, Cr, and the like are used in combination with reducing agents such as organoaluminum; (3) homogenous hydrogenation catalysts, e.g., so-called organometallic complexes such as organometallic compounds of Ti, Ru, Rh, and Zr; and the like. Specific examples thereof include, but are not limited to, hydrogenation catalysts described in Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, Japanese Patent Publication No. 2-9041, and the like.

Each of the hydrogenated block copolymer (1) and the hydrogenated copolymers (2) and (3) used in the present embodiment may have a functional-group-containing atomic group.

Examples of the functional group include, but are not limited to, a hydroxyl group, a carboxyl group, a carbonyl group, a thiocarbonyl group, an acid halide group, an acid anhydride group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, an alkoxy silicon group, a tin halide group, a boronic acid group, a boron-containing group, a boronic acid salt group, an alkoxy tin group, and a phenyl tin group.

(Tackifier)

The composition of the present embodiment may comprise a tackifier. The tackifier in the present embodiment is not particularly limited as long as it is a resin that is capable of imparting viscosity to the composition of the present embodiment, and examples thereof include known tackifiers such as rosin terpene resins, hydrogenated rosin terpene resins, cumarone resins, phenol resins, terpene-phenol resins, aromatic hydrocarbon resins, and aliphatic hydrocarbon resins. Tackifiers may be used singly, or two or more may be used as a mixture. Specific examples of usable tackifiers are those described in "Chemicals for Rubber/Plastics" (by Rubber Digest, Co., Ltd., Japan). Tackifiers improve tack strength.

The tackifier content in the composition of the present embodiment is preferably 0 to 100 parts by mass, more preferably 0.1 to 80 parts by mass, and even more preferably 1.0 to 60 parts by mass, based on the total mass of the hydrogenated block copolymer (1), the hydrogenated copolymer (2), and the hydrogenated copolymer (3) being 100 parts by mass. When the tackifier content is 100 parts by mass or less, there is a tendency that excessive tack strength after long-term attachment can be effectively prevented, and the amount of adhesive residue can be more reduced when the composition is peeled off, and therefore such a tackifier content is preferable.

(Other Additives)

<Hydrogenated Styrenic Elastomers>

The composition of the present embodiment may further comprise a hydrogenated styrenic elastomer having a structure different from that of the above-described block copolymer of the present embodiment.

The hydrogenated styrenic elastomer is not particularly limited, and typical hydrogenated styrenic elastomers are, for example, styrene-butadiene-styrene (SBS), styrene-ethylene-butylene-styrene (SEBS) obtained by saturating styrene-isoprene-styrene by hydrogenation, and styrene-ethylene-propylene-styrene (SEPS). In addition, elastomers having such structures as styrene-ethylene-butylene (SEB) and styrene-ethylene-propylene (SEP) may be used.

Moreover, reactive elastomers may be used, which are obtained by adding a variety of functional groups to the above hydrogenated styrenic elastomers. Examples of the functional groups include, but are not limited to, a hydroxyl group, a carboxyl group, a carbonyl group, a thiocarbonyl group, an acid halide group, an acid anhydride group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, an alkoxy silicon group, a tin halide group, a boronic acid group, a boron-containing group, a boronic acid salt group, an alkoxy tin group, and a phenyl tin group.

<Ethylene Vinyl Acetate Copolymers>

The composition of the present embodiment may further comprise an ethylene vinyl acetate copolymer. The ethylene vinyl acetate copolymer can be produced, for example, by subjecting ethylene and vinyl acetate to radical copolymerization under high-temperature, high-pressure conditions, but the production method is not particularly limited. Although the properties of the ethylene vinyl acetate copolymer depend on the vinyl acetate content, the vinyl acetate content is not particularly limited.

<Acrylic Copolymers>

The tacky composition of the present embodiment may further comprise an acrylic copolymer. Examples of the acrylic copolymer include, but are not particularly limited to, copolymers of methyl acrylate, ethyl acrylate, methyl methacrylate, acrylnitrile, and the like with vinyl acetate, vinyl chloride, styrene, and the like.

<Softening Agents>

The composition of the present embodiment may further comprise a softening agent. The softening agent is not particularly limited, and, for example, both mineral-oil softening agents and synthetic-resin softening agents are usable. In general, examples of mineral-oil softening agents include mixtures of aromatic hydrocarbons, naphthenic hydrocarbons, and paraffinic hydrocarbons. Oils in which carbon atoms of paraffinic hydrocarbons account for 50% or more of all carbon atoms are referred to as paraffinic oils, oils in which carbon atoms of naphthenic hydrocarbons account for 30 to 45% are referred to as naphthenic oils, and oils in which carbon atoms of aromatic hydrocarbons account for 35% or more are referred to as aromatic oils. Paraffinic oils, which are softening agents for rubbers, are preferable as mineral-oil softening agents, and polybutene, low molecular weight polybutadiene, and the like are preferable as synthetic-resin softening agents. When a softening agent is contained, the tacky composition of the present embodiment tends to have more improved tackiness.

From the viewpoint of suppressing the bleeding of a softening agent and ensuring practically sufficient tack strength in the composition of the present embodiment, the softening agent content in the composition of the present embodiment is preferably 0 to 100 parts by mass and more preferably 0.1 to 80 parts by mass based on the total mass of the hydrogenated block copolymer (1) and the hydrogenated copolymers (2) and (3) being 100 parts by mass.

<Antioxidants, Light Stabilizers, etc.>

Furthermore, a stabilizer such as an antioxidant, a light stabilizer, or the like may be added to the tacky composition of the present embodiment.

Examples of the antioxidant include, but are not limited to, hindered phenol antioxidants such as 2,6-di-t-butyl-4-methylphenol, n-octadecyl-3-(4'-hydroxy-3',5'-di-t-butylphenyl)propionate, 2,2'-methylenebis(4-methyl-6-t-butylphenol), 2,2'-methylenebis(4-ethyl-6-t-butylphenol), 2,4-bis[(octylthio)methyl]-o-cresol, 2-t-butyl-6-(3-t-butyl-2-hydroxy-5-methylbenzyl)-4-methylphenylacrylate, 2,4-di-t-amyl-6-[1-(3,5-di-t-amyl-2-hydroxyphenyl)ethyl]phenylacrylate, and 2-[1-(2-hydroxy-3,5-di-tert-pentylphenyl)]acrylate; sulfur antioxidants such as dilauryl thiodipropionate and lauryl stearyl thiodipropionate pentaerythritol-tetrakis(β-lauryl thiopropionate); and phosphorus antioxidants such as tris(nonylphenyl) phosphite and tris(2,4-di-t-butylphenyl) phosphite.

Examples of the light stabilizer include, but are not limited to, benzotriazole ultraviolet absorbers such as 2-(2'-hydroxy-5'-methylphenyl)benzotriazole, 2-(2'-hydroxy-3', 5'-t-butylphenyl)benzotriazole, and 2-(2'-hydroxy-3',5'-di-t-butylphenyl)-5-chlorobenzotriazole; benzophenone ultraviolet absorbers such as 2-hydroxy-4-methoxybenzophenone; and hindered amine light stabilizers.

<Pigments, Waxes, Thermoplastic Resins, Natural Rubbers, Synthetic Rubbers>

In addition to the above-described additives, the composition of the present embodiment can comprise various additives as necessary. Examples of such additives include, but are not limited to, pigments such as iron red and titanium dioxide; waxes such as paraffin wax, microcrystalline wax, and low molecular weight polyethylene wax; polyolefin or low molecular weight vinylaromatic thermoplastic resins such as amorphous polyolefin and ethylene ethyl acrylate copolymers; natural rubbers; and synthetic rubbers such as polyisoprene rubber, polybutadiene rubber, styrene-butadiene rubber, ethylene-propylene rubber, chloroprene rubber, acrylic rubber, isoprene-isobutylene rubber, and polypentenamer rubber. Examples of such synthetic rubbers also include those described in "Chemicals for Rubber/Plastics" (by Rubber Digest, Co., Ltd., Japan) and the like in addition to the above synthetic rubbers.

(Production Method for Composition)

The method for producing the composition of the present embodiment is not particularly limited, and the composition can be produced by conventionally known methods. For example, melt kneading methods involving a commonly used mixer such as a Banbury mixer, a monoaxial screw extruder, a biaxial screw extruder, a co-kneader, or a multiaxial screw extruder; methods in which components are dissolved or dispersion-mixed, then applied to a substrate film with a coater or the like, and heated to remove the solvent; and similar methods are used.

Foaming treatment may be performed on the composition of the present embodiment to reduce weight, provide flexibility, and improve adhesion. Examples of foaming methods include, but are not limited to, chemical methods, physical methods, the use of thermally expandable microballoons, and the like. Such methods can each distribute voids in a material, for example, by adding a chemical blowing agent, such as an inorganic blowing agent or an organic blowing agent, or a physical blowing agent or by adding thermally expandable microballoons. Moreover, a hollow filler (expanded balloons) may also be added to reduce weight, provide flexibility, and improve adhesion.

(Surface Protection Film)

The surface protection film of the present embodiment comprises the composition of the present embodiment. It is preferable that the surface protection film of the present embodiment is configured to include a tackifier layer formed by laminating the hydrogenated block copolymer (1), the hydrogenated copolymer (2) and the hydrogenated copolymer (3), described in the above embodiment, on a predetermined substrate film.

The material of the substrate film is not particularly limited, and any nonpolar resin or polar resin is usable. In terms of performance, cost, etc., preferable examples of nonpolar resins can be polyethylene and homo- or block-polypropylene, and preferable examples of polar resins can be polyester resins such as polyethylene terephthalate and polybutylene terephthalate, polyamide resins, ethylene-vinylacetate copolymers, hydrolysates thereof, and the like.

The thickness of the tackifier layer constituting the surface protection film of the present embodiment is preferably 1.0 μm or more and 100 μm or less, and more preferably 5.0 μm or more and 100 μm or less. When the thickness of the tackifier layer is 100 μm or less, the surface protection film tends to have better handleability, and is economically preferable as well. Moreover, when the thickness is 1 μm or more, the surface protection film tends to have better adhesion, and also uniform thickness is likely to be obtained. The thickness of the substrate film is preferably 5.0 mm or less, more preferably 3.0 mm or less, even more preferably 1.0 mm or less, even more preferably 300 μm or less, and yet more preferably 10 μm or more and 200 μm or less. A film having a thickness of more than 300 μm is generally referred to as a "sheet", and such a sheet is collectively referred to as a film herein.

(Production Method for Surface Protection Film)

Examples of the method for producing the surface protection film of the present embodiment include, but are not limited to, a method in which a solution or a melt of the composition of the present embodiment is applied to the above substrate film, a method involving a film extruder, and the like. Here, in the case of using a solution of the composition of the present embodiment, a solution or a melt may be formed after the composition is obtained, or respective solutions or melts of the hydrogenated block copolymer (1), the hydrogenated copolymer (2), and the hydrogenated copolymer (3) may be formed first and then mixed.

Although the method in which a solution of the composition of the present embodiment is applied is not limited to the following, the surface protection film can be produced, for example, by dissolving the components in a solvent, applying the solution to a substrate film with a coater or the like, and thermally drying the solvent.

Although the method in which the composition of the present embodiment is melted and applied is not limited to the following, the surface protection film can be produced, for example, by applying the molten composition of the present embodiment to a substrate film with a hot melt coater or the like. In this case, a variety of substrate films are preferably used that have a higher glass transition temperature, melting point, or softening point than the coating temperature.

Although the film extruder method is not limited to the following, the surface protection film can be produced, for example, in such a manner that the components of the adhesive layer containing the composition of the present embodiment and the components such as a thermoplastic resin that can constitute the substrate film layer are formed into two streams in a melt coextruder, or that is to say, a fluid for forming the tackifier layer and a fluid for forming the substrate film are merged in a dice port and formed into a single fluid and extruded to combine the tackifier layer and the resin film layer.

The film extruder method has excellent productivity because the composition of the present embodiment can be produced also by dry-blending the components of the block copolymer for a viscous adhesive or of the viscous adhesive composition in advance. Moreover, when extrusion molding is performed, the produced surface protection film tends to have particularly remarkable adhesion and bonding strength.

EXAMPLES

Below, the present embodiment will now be described in detail by way of specific Examples and Comparative Examples, but the present embodiment is not limited to the Examples below. First, the evaluation methods and the methods for measuring physical properties applied to the Examples and the Comparative Examples will now be described below.

[I. Evaluations of Compositions and Structures of Hydrogenated Block Copolymer (1), Hydrogenated Copolymer (2), and Hydrogenated Copolymer (3)]

(I-1) Content of Vinyl Aromatic Compound Monomer Unit (Styrene Content), Amount of Vinyl Bonds of Conjugated Diene Monomer Unit, and Degree of Hydrogenation of Double Bonds Based on Conjugated Diene Monomer Unit The styrene content in a polymer, the amount of vinyl bonds of a conjugated diene monomer unit, and the degree of hydrogenation of double bonds based on a conjugated diene monomer unit were determined by nuclear magnetic resonance spectrum analysis (NMR) measurement under the following conditions.

Measurement instrument: JNM-LA400 (manufactured by JEOL Ltd.)
Solvent: Deuterated chloroform
Measuring samples: Polymer sampled before or after hydrogenation
Sample concentration: 50 mg/mL
Observation frequency: 400 MHz
Chemical shift reference: TMS (tetramethylsilane)
Pulse delay: 2.904 sec
Number of scans: 64
Pulse width: 45°
Measurement temperature: 26° C.

(I-2) MFR (Melt Flow Rate)

The melt flow rate was measured in accordance with ISO 1133 at a temperature of 230° C. under a load of 2.16 kg.

(I-3) Weight Average Molecular Weight

Gel permeation chromatography (GPC) was performed under the following conditions to determine the weight average molecular weight from the molecular weights at the resulting peaks in reference to a calibration curve in terms of polystyrene (PS).

Measurement apparatus: GPC HLC-8220 (manufactured by Tosoh Corporation, trade name)
Columns: One TAKgelGMHXL SuperH5000 column: Two SuperH4000 columns (manufactured by Tosoh Corporation, trade names)
Solvent: Tetrahydrofuran
Temperature: 40° C.
Calibration curve sample: Commercially available standard sample (manufactured by Tosoh Corporation), ten-point measurement (I-4) Content of Block A (Styrene Block)

Using a copolymer before hydrogenation, decomposition and measurement were performed by the osmium tetroxide oxidation method described in I. M. Kolthoff, et al., J. Polym. Sci., 1, p. 429 (1946). A 0.1 g osmic acid/125 mL tert-butanol solution was used for the decomposition of the copolymer.

(I-5) Loss Tangent Peak Top

A measuring sample was placed in the twist-type geometry of an ARES apparatus (manufactured by TA Instruments, trade name) and measured under the following conditions to determine the loss tangent peak top. The peak temperature was a value automatically determined by an RSI Orchestrator (manufactured by TA Instruments, trade name).

Measurement sample size: 2.0 mm thick, 12.6 mm wide, 40 mm long
Effective measurement length: 22 mm
Strain: 0.5%
Frequency: 1 Hz
Measurement temperature range: −100 to −150° C.
Heating rate: 3° C./min

[II. Properties of Composition]

(II-1) Adhesion

The surface protection films prepared in the Examples and the Comparative Examples below were attached to a PMMA plate (polymethyl methacrylate plate, arithmetic mean surface roughness: 1.1 μm) by rolling a 1 kg rubber roller (a diameter of 10 cm) at 23° C. x 50% RH, and then visually observed and evaluated in reference to the area ratio of adhered portions to pore portions as an indicator of adhesion. In Tables 3 and 4 below, adhesion was evaluated on a 4-point scale of ⊚, ◯, Δ, and X. The evaluation criteria thereof are as follows.

⊚: No visually observable voids over a peel area (1 m$^2$)
◯: One visually observable void over a peel area (1 m$^2$)
Δ: Two to four visually observable voids over a peel area (1 m$^2$)
X: Five or more visually observable voids over a peel area (1 m$^2$)

(II-2) Bonding Strength (g/25 mm)

A universal tension and compression tester "Techno Graph TGE-500N: manufactured by Minebea Co., Ltd." was used as a measurement apparatus. In Examples 1 to 14 and Comparative Examples 1 to 5 below, the prepared surface protection films that had been cut to have a width of 25 mm were attached to a PMMA plate (arithmetic mean surface roughness: 0.1 μm) at 23° C. x 50% RH, adhered by rolling a 2 kg rubber roller (a diameter of 10 cm), left to stand for 30 minutes, and then peeled off at a rate of 300 mm/min to measure peel strength. A 180° peel test was performed at 23° C. x 50% RH immediately after attachment as well as after thermal tack promotion. Initial tack strength was evaluated according to the initial bonding strength, and the change over time in bonding strength when the film was adhered for a long period of time was evaluated according to the bonding strength after thermal tack promotion. A film having an initial adhesion of 250 g/25 mm or more was judged as having practically good initial tack strength. Concerning the bonding strength after thermal tack promotion, a film having a bonding strength no more than twice the initial bonding strength was judged that its bonding strength is unlikely to change over time.

In Examples 1 to 14 and Comparative Examples 1 to 5 below, the evaluation after thermal tack promotion was made after attaching the prepared surface protection films in the above-described manner, then heating the films at 80° C. x 30 min in a gear oven for tack promotion, and leaving the films to stand for 30 minutes in the measurement environment.

The above "180° peel test" was performed in accordance with JIS K6854-2: Adhesives—Determination of peel strength of bonded assemblies—Part 2: 180° peel.

(II-3) Adhesive Residue

The surface protection films prepared in the Examples and the Comparative Examples below were attached to a PMMA plate (arithmetic mean surface roughness: 1.1 μm), adhered by rolling a 2 kg rubber roller (a diameter of 10 cm) at 23° C. x 50% RH, then heated at 80° C. x 30 min in a gear oven for tack promotion, left to stand for 30 minutes in the measurement environment, and then peeled off. Evaluations were made according to the adhesive residue remaining on the PMMA plate. The evaluations concerning adhesive residue in Table 2 were made based on a 3-point scale of ○, Δ, and X. The evaluation criteria thereof are as follows.

○: Zero to one visually observable point of an adhesive residue over a peel area (1 m$^2$).
Δ: Two to four visually observable points of an adhesive residue over a peel area (1 m$^2$).
X: Five or more visually observable points of an adhesive residue over a peel area (1 m$^2$).

[III. Preparation of Hydrogenation Catalyst]

The hydrogenation catalyst used for the hydrogenation reaction of the block copolymer was prepared in the following manner. A nitrogen-purged reaction vessel was charged with 1 liter of dried, purified cyclohexane, 100 mmol of (biscyclopentadienyl)titanium dichloride was added, and a n-hexane solution containing 200 mmol of trimethylaluminium was added while performing sufficient stirring, a reaction was carried out at room temperature for about 3 days to prepare a hydrogenation catalyst.

[IV. Preparation of Hydrogenated Copolymers]

<Polymer 1: Hydrogenated Product of Butadiene-Styrene-Butadiene-Styrene (B1-A1-B2-A2)>

Here, A1, A2, B1, B2, and C1 respectively represent the following polymer blocks.
A1, A2: Polystyrene polymer blocks
B1, B2: Polybutadiene copolymer blocks
C1: Random copolymer block of styrene and butadiene Batch polymerization was performed in the following manner with a stirred jacketed tank reactor having an internal volume of 10 L. First, the reactor was charged with 1 L of cyclohexane, and the temperature was adjusted to 70° C. Then, 0.07 parts by mass of n-butyllithium was added based on 100 parts by mass of the total amount of the butadiene monomer and the styrene monomer introduced into the reactor (hereinafter referred to as all monomers), 1.8 mol of N,N,N',N'-tetramethylethylenediamine (hereinafter referred to as TMEDA) was added based on 1 mol of n-butyllithium, and 0.05 mol of sodium t-pentoxide (hereinafter referred to as NaOAm) was added per TMEDA.

As a first step, a cyclohexane solution containing 4.5 parts by mass of butadiene (a concentration of 20 mass %) was introduced over 6 minutes, and then a reaction was carried out for 10 minutes (the temperature was controlled to 70° C. during polymerization). At this point, the polymer solution was sampled, and the measured polymerization conversion of butadiene was 100%.

Next, as a second step, a cyclohexane solution containing 8.3 parts by mass of styrene (a concentration of 20 mass %) was introduced over 10 minutes, and then a reaction was carried out for 10 minutes (the temperature was controlled to 70° C. during polymerization). At this point, the polymer solution was sampled, and the measured polymerization conversion of styrene was 100%.

Next, as a third step, a cyclohexane solution containing 80.5 parts by mass of butadiene (a concentration of 20 mass %) was introduced over 70 minutes, and then a reaction was carried out for 10 minutes (the temperature was controlled to 70° C. during polymerization). At this point, the polymer solution was sampled, and the measured polymerization conversion of butadiene was 100%.

Next, as a fourth step, a cyclohexane solution containing 6.7 parts by mass of styrene (a concentration of 20 mass %) was introduced over 10 minutes, and then a reaction was carried out for 10 minutes (the temperature was controlled to 70° C. during polymerization). At this point, the polymer solution was sampled, and the measured polymerization conversion of styrene was 100%.

Next, the above hydrogenation catalyst was added to the resulting copolymer in an amount of 100 ppm in terms of titanium based on 100 parts by mass of the polymer, and a hydrogenation reaction was carried out under a hydrogen pressure of 0.7 MPa at a temperature of 70° C. Thereafter, methanol was added and, next, 0.3 parts by mass of octadecyl-3-(3,5-di-t-butyl-4-hydroxyphenyl)propionate was added as a stabilizer based on 100 parts by mass of the polymer to obtain (polymer 1). The resulting (polymer 1) had a styrene content of 15.0 mass %, an amount of vinyl bonds of the butadiene block portion of 75.2% before hydrogenation, a weight average molecular weight of 167,000, a degree of hydrogenation of 98%, an MFR (a temperature of 230° C., a load of 2.16 kg) of 7.0 g/10 min, and only one loss tangent peak top at −24.2° C.

<Polymer 2: Hydrogenated Product of Butadiene-Styrene-Butadiene-Styrene (B1-A1-B2-A2)>

As with the synthesis of (polymer 1) above, batch polymerization was performed in the following manner with a stirred jacketed tank reactor having an internal volume of 10 L. First, the reactor was charged with 1 L of cyclohexane, and the temperature was adjusted to 70° C. Then, 0.1 parts by mass of n-butyllithium was added based on 100 parts by mass of all monomers, and 1.0 mol of TMEDA was added based on 1 mol of n-butyllithium.

As a first step, a cyclohexane solution containing 4.5 parts by mass of butadiene (a concentration of 20 mass %) was introduced over 6 minutes, and then a reaction was carried out for 10 minutes (the temperature was controlled to 70° C. during polymerization). At this point, the polymer solution was sampled, and the measured polymerization conversion of butadiene was 100%.

Next, as a second step, a cyclohexane solution containing 11.0 parts by mass of styrene (a concentration of 20 mass %) was introduced over 10 minutes, and then a reaction was carried out for 10 minutes (the temperature was controlled to 70° C. during polymerization). At this point, the polymer solution was sampled, and the measured polymerization conversion of styrene was 100%.

Next, as a third step, a cyclohexane solution containing 75.5 parts by mass of butadiene (a concentration of 20 mass %) was introduced over 70 minutes, and then a reaction was carried out for 10 minutes (the temperature was controlled to 70° C. during polymerization). At this point, the polymer solution was sampled, and the measured polymerization conversion of butadiene was 100%.

Next, as a fourth step, a cyclohexane solution containing 9.0 parts by mass of styrene (a concentration of 20 mass %) was introduced over 10 minutes, and then a reaction was carried out for 10 minutes (the temperature was controlled to 70° C. during polymerization). At this point, the polymer solution was sampled, and the measured polymerization conversion of styrene was 100%.

Next, the above hydrogenation catalyst was added to the resulting copolymer in an amount of 95 ppm in terms of titanium based on 100 parts by mass of the polymer, and a hydrogenation reaction was carried out under a hydrogen pressure of 0.7 MPa at a temperature of 70° C. Thereafter, methanol was added and, next, 0.3 parts by mass of octadecyl-3-(3,5-di-t-butyl-4-hydroxyphenyl)propionate was added as a stabilizer based on 100 parts by mass of the polymer to obtain (polymer 2). The resulting (polymer 2) had a styrene content of 20.0 mass %, an amount of vinyl bonds of the butadiene block portion of 60.0% before hydrogenation, a weight average molecular weight of 122,000, a degree of hydrogenation of 90%, an MFR (a temperature of 230° C., a load of 2.16 kg) of 5.1 g/10 min, and only one loss tangent peak top at −46.9° C.

<Polymer 3: Hydrogenated Product of Butadiene-Styrene-Butadiene-Styrene (B1-A1-B2-A2)>

As with the synthesis of (polymer 1) above, batch polymerization was performed in the following manner with a stirred jacketed tank reactor having an internal volume of 10 L. First, the reactor was charged with 1 L of cyclohexane, and the temperature was adjusted to 70° C. Then, 0.06 parts by mass of n-butyllithium was added based on 100 parts by mass of all monomers, 1.8 mol of TMEDA was added based on 1 mol of n-butyllithium, and 0.06 mol of NaOAm was added per TMEDA.

As a first step, a cyclohexane solution containing 4.5 parts by mass of butadiene (a concentration of 20 mass %) was introduced over 6 minutes, and then a reaction was carried out for 10 minutes (the temperature was controlled to 70° C. during polymerization). At this point, the polymer solution was sampled, and the measured polymerization conversion of butadiene was 100%.

Next, as a second step, a cyclohexane solution containing 4.4 parts by mass of styrene (a concentration of 20 mass %) was introduced over 10 minutes, and then a reaction was carried out for 10 minutes (the temperature was controlled to 70° C. during polymerization). At this point, the polymer solution was sampled, and the measured polymerization conversion of styrene was 100%.

Next, as a third step, a cyclohexane solution containing 87.5 parts by mass of butadiene (a concentration of 20 mass %) was introduced over 90 minutes, and then a reaction was carried out for 10 minutes (the temperature was controlled to 60° C. during polymerization). At this point, the polymer solution was sampled, and the measured polymerization conversion of butadiene was 100%.

Next, as a fourth step, a cyclohexane solution containing 3.6 parts by mass of styrene (a concentration of 20 mass %) was introduced over 10 minutes, and then a reaction was carried out for 10 minutes (the temperature was controlled to 70° C. during polymerization). At this point, the polymer solution was sampled, and the measured polymerization conversion of styrene was 100%.

Next, the above hydrogenation catalyst was added to the resulting copolymer in an amount of 100 ppm in terms of titanium based on 100 parts by mass of the polymer, and a hydrogenation reaction was carried out under a hydrogen pressure of 0.7 MPa at a temperature of 70° C. Thereafter, methanol was added and, next, 0.3 parts by mass of octadecyl-3-(3,5-di-t-butyl-4-hydroxyphenyl)propionate was added as a stabilizer based on 100 parts by mass of the polymer to obtain (polymer 3). The resulting (polymer 3) had a styrene content of 8.0 mass %, an amount of vinyl bonds of the butadiene block portion of 90.0% before hydrogenation, an weight average molecular weight of 199,000, a degree of hydrogenation of 98%, an MFR (a temperature of 230° C., a load of 2.16 kg) of 5.3 g/10 min, and only one loss tangent peak top at −20.0° C.

<Polymer 4: Hydrogenated Product of Styrene-Butadiene-Styrene (A1-B1-A2)>

As with the synthesis of (polymer 1) above, batch polymerization was performed in the following manner with a stirred jacketed tank reactor having an internal volume of 10 L. First, the reactor was charged with 1 L of cyclohexane, and the temperature was adjusted to 70° C. Then, 0.075 parts by mass of n-butyllithium was added based on 100 parts by mass of all monomers, and 1.0 mol of TMEDA was added based on 1 mol of n-butyllithium.

As a first step, a cyclohexane solution containing 8.3 parts by mass of styrene (a concentration of 20 mass %) was introduced over 10 minutes, and then a reaction was carried out for 10 minutes (the temperature was controlled to 70° C. during polymerization). At this point, the polymer solution was sampled, and the measured polymerization conversion of butadiene was 100%.

Next, as a second step, a cyclohexane solution containing 85.0 parts by mass of butadiene (a concentration of 20 mass %) was introduced over 70 minutes, and then a reaction was carried out for 10 minutes (the temperature was controlled to 70° C. during polymerization). At this point, the polymer solution was sampled, and the measured polymerization conversion of butadiene was 100%.

Next, as a third step, a cyclohexane solution containing 6.7 parts by mass of styrene (a concentration of 20 mass %) was introduced over 10 minutes, and then a reaction was carried out for 10 minutes (the temperature was controlled to 70° C. during polymerization). At this point, the polymer solution was sampled, and the measured polymerization conversion of styrene was 100%.

Next, the above hydrogenation catalyst was added to the resulting copolymer in an amount of 100 ppm in terms of titanium based on 100 parts by mass of the polymer, and a hydrogenation reaction was carried out under a hydrogen pressure of 0.7 MPa at a temperature of 70° C. Thereafter, methanol was added and, next, 0.3 parts by mass of octadecyl-3-(3,5-di-t-butyl-4-hydroxyphenyl)propionate was added as a stabilizer based on 100 parts by mass of the polymer to obtain (polymer 4). The resulting (polymer 4) had a styrene content of 15.0 mass %, an amount of vinyl bonds of the butadiene block portion of 75.2% before hydrogenation, a weight average molecular weight of 147,000, a degree of hydrogenation of 98%, an MFR (a temperature of 230° C., a load of 2.16 kg) of 7.0 g/10 min, and only one loss tangent peak top at −24.2° C.

<Polymer 5: Hydrogenated Product of Butadiene-Styrene-Butadiene-Styrene (B1-A1-B2-A2)>

The same procedure as the synthesis of (polymer 1) above was followed except that 1.5 mol, instead of 1.8 mol, of TMEDA was added based on 1 mol of n-butyllithium, and NaOAm was not added. The resulting (polymer 5) had an amount of vinyl bonds of the butadiene block portion of 47.0 mass % before hydrogenation, and only one loss tangent peak top at −30.5° C.

<Polymer 6: Hydrogenated Product of Butadiene-Styrene-Butadiene-Styrene (B1-A1-B2-A2)>

The same procedure as the synthesis of (polymer 1) above was followed except that 0.05 parts by mass, instead of 0.07 parts by mass, of n-butyllithium was added based on 100 parts by mass of all monomers. The resulting (polymer 6) had a weight average molecular weight of 200,000, an MFR (a temperature of 230° C., a load of 2.16 kg) of 0.5 g/10 min, and only one loss tangent peak top at −24.0° C.

<Polymer 7: Hydrogenated Product of Butadiene-Styrene-Butadiene-Styrene (B1-A1-B2-A2)>

The same procedure as the synthesis of (polymer 1) above was followed except that 65 ppm, instead of 100 ppm, of the hydrogenation catalyst in terms of titanium was added based on 100 parts by mass of the polymer to carry out the hydrogenation reaction. The resulting (polymer 7) had a degree of hydrogenation of 60%, an MFR (a temperature of 230° C., a load of 2.16 kg) of 15.0 g/10 min, and only one loss tangent peak top at −30.2° C.

<Polymer 8: Hydrogenated Product of Styrene—Styrene/Butadiene Random—Styrene (A1-C1-A2)>

As with the synthesis of (polymer 1) above, batch polymerization was performed in the following manner with a stirred jacketed tank reactor having an internal volume of 10 L. The reactor was charged with 1 L of cyclohexane, and the temperature was adjusted to 70° C. Then, 0.05 parts by mass of n-butyllithium was added based on 100 parts by mass of all monomers, and 0.4 mol of TMEDA was added based on 1 mol of n-butyllithium.

As a first step, a cyclohexane solution containing 5 parts by mass of styrene (a monomer concentration of 22 mass %) was introduced over 3 minutes, and then a reaction was carried out for 20 minutes (the temperature was controlled to 70° C. during polymerization). At this point, the polymer solution was sampled, and the measured polymerization conversion of styrene was 100%.

Next, as a second step, a cyclohexane solution containing 42 parts by mass of styrene and 48 parts by mass of butadiene (a monomer concentration of 22 mass %) was continuously introduced into the reactor at a constant rate over 60 minutes, and then a reaction was carried out for 30 minutes (the temperature was controlled to 70° C. during polymerization). At this point, the polymer solution was sampled, and the measured polymerization conversion of styrene/butadiene was 100%.

Next, as a third step, a cyclohexane solution containing 5 parts by mass of styrene (a monomer concentration of 22 mass %) was introduced over about 3 minutes, and then a reaction was carried out for 20 minutes (the temperature was controlled to 70° C. during polymerization). At this point, the polymer solution was sampled, and the measured polymerization conversion of styrene was 100%.

Next, 100 ppm of the above hydrogenation catalyst in terms of titanium was added to the resulting copolymer based on 100 parts by mass of the polymer, and a hydrogenation reaction was carried out under a hydrogen pressure of 0.7 MPa at a temperature of 70° C. Thereafter, methanol was added and, next, 0.3 parts by mass of octadecyl-3-(3,5-di-t-butyl-4-hydroxyphenyl)propionate was added as a stabilizer based on 100 parts by mass of the polymer to obtain (polymer 8). The resulting (polymer 8) had a styrene content of 52.0 mass %, a block A content of 10.0 mass %, an amount of vinyl bonds of the butadiene block portion of 26.0 mass % before hydrogenation, a weight average molecular weight of 163,000, a degree of hydrogenation of 98%, an MFR (a temperature of 230° C., a load of 2.16 kg) of 4.5 g/10 min, and only one loss tangent peak top at −12.8° C.

<Polymer 9: Bifunctional Coupling of Styrene—Styrene/Butadiene Random (A1-C1)×2)>

As with the synthesis of polymer 1 above, batch polymerization was performed in the following manner with a stirred jacketed tank reactor having an internal volume of 10 L. The reactor was charged with 1 L of cyclohexane, and the temperature was adjusted to 70° C. Then, 0.085 parts by mass of n-butyllithium was added based on 100 parts by mass of all monomers, and 0.7 mol of TMEDA was added based on 1 mol of n-butyllithium.

As a first step, a cyclohexane solution containing 10 parts by mass of styrene (a monomer concentration of 22 mass %) was introduced over 3 minutes, and then a reaction was carried out for 20 minutes (the temperature was controlled to 70° C. during polymerization). At this point, the polymer solution was sampled, and the measured polymerization conversion of styrene was 100%.

Next, as a second step, a cyclohexane solution containing 57 parts by mass of styrene and 33 parts by mass of butadiene (a monomer concentration of 22 mass %) was continuously introduced into the reactor at a constant rate over 60 minutes, and then a reaction was carried out for 30 minutes (the temperature was controlled to 70° C. during polymerization). At this point, the polymer solution was sampled, and the polymerization conversion and the weight average molecular weight of styrene/butadiene measured were a polymerization conversion of 100% and a weight average molecular weight of 95,000.

Thereafter, 0.5 mol of ethyl benzoate was added based on 1 mol of the lithium content in n-butyllithium, and a reaction was carried out for 10 minutes for a coupling reaction (the temperature was controlled to 70° C. during reaction).

Next, 100 ppm of the above hydrogenation catalyst in terms of titanium was added to the resulting copolymer based on 100 parts by mass of the polymer, and a hydrogenation reaction was carried out under a hydrogen pressure of 0.7 MPa at a temperature of 70° C. Thereafter, methanol was added and, next, 0.3 parts by mass of octadecyl-3-(3,5-di-t-butyl-4-hydroxyphenyl)propionate was added as a stabilizer based on 100 parts by mass of the polymer to obtain (polymer 9). The resulting (polymer 9) had a styrene content of 67.0 mass %, a block A content of 10.0 mass %, an amount of vinyl bonds of the butadiene block portion of 29.0 mass % before hydrogenation, a weight average molecular weight of 190,000, a degree of coupling of 53%, a degree of hydrogenation of 98%, an MFR (a temperature of 230° C., a load of 2.16 kg) of 6.0 g/10 min, and only one loss tangent peak top at 22.5° C. The ratio of the polymers before and after coupling was that the polymer having a weight average molecular weight of 95,000 was 47 mass %, and the polymer having a weight average molecular weight of 190,000 was 53 mass %.

<Polymer 10: Hydrogenated Product of Styrene—Styrene/Butadiene Random—Styrene (A1-C1-A2)>

As with the synthesis of (polymer 1) above, batch polymerization was performed in the following manner with a stirred jacketed tank reactor having an internal volume of 10 L. The reactor was charged with 1 L of cyclohexane, and the temperature was adjusted to 70° C. Then, 0.08 parts by mass of n-butyllithium was added based on 100 parts by mass of all monomers, 1.2 mol of TMEDA was added based on 1 mol of n-butyllithium, and 0.05 mol of NaOAm was added per TMEDA.

As a first step, a cyclohexane solution containing 12.5 parts by mass of styrene (a monomer concentration of 22 mass %) was introduced over 5 minutes, and then a reaction was carried out for 20 minutes (the temperature was controlled to 70° C. during polymerization). At this point, the polymer solution was sampled, and the measured polymerization conversion of styrene was 100%.

Next, as a second step, a cyclohexane solution containing 15 parts by mass of styrene and 60 parts by mass of butadiene (a monomer concentration of 22 mass %) was continuously introduced into the reactor at a constant rate over 60 minutes, and then a reaction was carried out for 30 minutes (the temperature was controlled to 60° C. during polymerization). At this point, the polymer solution was sampled, and the measured polymerization conversion of styrene/butadiene was 100%.

Next, as a third step, a cyclohexane solution containing 12.5 parts by mass of styrene (a monomer concentration of 22 mass %) was introduced over about 3 minutes, and then a reaction was carried out for 20 minutes (the temperature was controlled to 70° C. during polymerization). At this point, the polymer solution was sampled, and the measured polymerization conversion of styrene was 100%.

Next, 95 ppm of the above hydrogenation catalyst in terms of titanium was added to the resulting copolymer based on 100 parts by mass of the polymer, and a hydrogenation reaction was carried out under a hydrogen pressure of 0.7 MPa at a temperature of 70° C. Thereafter, methanol was added and, next, 0.3 parts by mass of octadecyl-3-(3,5-di-t-butyl-4-hydroxyphenyl)propionate was added as a stabilizer based on 100 parts by mass of the polymer to obtain (polymer 10). The resulting (polymer 10) had a styrene content of 40.0 mass %, a block A content of 25 mass %, an amount of vinyl bonds of the butadiene block portion of 40.0 mass % before hydrogenation, a weight average molecular weight of 136,000, a degree of hydrogenation of 93%, an MFR (a temperature of 230° C., a load of 2.16 kg) of 6.8 g/10 min, and only one loss tangent peak top at −33.1° C.

<Polymer 11: Hydrogenated Product of Styrene—Styrene/Butadiene Random—Styrene (A1-C1-A2)>

As with the synthesis of (polymer 1) above, batch polymerization was performed in the following manner with a stirred jacketed tank reactor having an internal volume of 10 L. The reactor was charged with 1 L of cyclohexane, and the temperature was adjusted to 70° C. Then, 0.05 parts by mass of n-butyllithium was added based on 100 parts by mass of all monomers, and 0.7 mol of TMEDA was added based on 1 mol of n-butyllithium.

As a first step, a cyclohexane solution containing 5 parts by mass of styrene (a monomer concentration of 22 mass %) was introduced over 3 minutes, and then a reaction was carried out for 20 minutes (the temperature was controlled to 70° C. during polymerization). At this point, the polymer solution was sampled, and the measured polymerization conversion of styrene was 100%.

Next, as a second step, a cyclohexane solution containing 68 parts by mass of styrene and 25 parts by mass of butadiene (a monomer concentration of 22 mass %) was continuously introduced into the reactor at a constant rate over 60 minutes, and then a reaction was carried out for 30 minutes (the temperature was controlled to 70° C. during polymerization). At this point, the polymer solution was sampled, and the measured polymerization conversion of styrene/butadiene was 100%.

Next, as a third step, a cyclohexane solution containing 2 parts by mass of styrene (a monomer concentration of 22 mass %) was introduced over about 3 minutes, and then a reaction was carried out for 20 minutes (the temperature was controlled to 70° C. during polymerization). At this point, the polymer solution was sampled, and the measured polymerization conversion of styrene was 100%.

Next, 100 ppm of the above hydrogenation catalyst in terms of titanium was added to the resulting copolymer based on 100 parts by mass of the polymer, and a hydrogenation reaction was carried out under a hydrogen pressure of 0.7 MPa at a temperature of 70° C. Thereafter, methanol was added and, next, 0.3 parts by mass of octadecyl-3-(3,5-di-t-butyl-4-hydroxyphenyl)propionate was added as a stabilizer based on 100 parts by mass of the polymer to obtain (polymer 11). The resulting (polymer 11) had a styrene content of 75.0 mass %, a block A content of 7.0 mass %, an amount of vinyl bonds of the butadiene block portion of 20.0 mass % before hydrogenation, a weight average molecular weight of 138,000, a degree of hydrogenation of 98%, an MFR (a temperature of 230° C., a load of 2.16 kg) of 9.9 g/10 min, and only one loss tangent peak top at 38.5° C.

<Polymer 12: Hydrogenated Product of Styrene—Styrene/Butadiene Random—Styrene (A1-C1-A2)>

The same procedure as the synthesis of (polymer 7) above was followed except that 45 ppm, instead of 100 ppm, of the hydrogenation catalyst in terms of titanium was added based on 100 parts by mass of the polymer to carry out the hydrogenation reaction. The resulting (polymer 12) had a degree of hydrogenation of 53% and a loss tangent peak at −13.8° C.

<Polymer 13: Hydrogenated Product of Styrene—Styrene/Butadiene Random—Styrene (A1-C1-A2)>

The same procedure as the synthesis of (polymer 7) above was followed except that 1.8 mol, instead of 0.4 mol, of TMEDA was added based on 1 mol of n-butyllithium and, at the same time, NaOAm was newly added in an amount of 0.06 mol per TMEDA; and moreover, in the second step, a cyclohexane solution containing 13.5 parts by mass of styrene and 76.5 parts by mass of butadiene (a monomer concentration of 22 mass %), instead of a cyclohexane solution containing 42 parts by mass of styrene and 48 parts by mass of butadiene, was introduced into the reactor, and the temperature was controlled to 60° C. instead of controlling it to 70° C. to carry out polymerization. The resulting (polymer 13) had a styrene content of 23.5 mass %, an amount of vinyl bonds of the butadiene block portion of 55% before hydrogenation, a weight average molecular weight of 147,000, an MFR (a temperature of 230° C., a load of 2.16 kg) of 4.9 g/10 min, and only one loss tangent peak top at −34.7° C.

<Polymer 14: Hydrogenated Product of Styrene—Butadiene—Styrene/Butadiene Random—Styrene (A1-B1-C1-A2)>

As with the synthesis of (polymer 1) above, batch polymerization was performed in the following manner with a stirred jacketed tank reactor having an internal volume of 10 L. The reactor was charged with 1 L of cyclohexane, and the temperature was adjusted to 70° C. Then, 0.05 parts by mass of n-butyllithium was added based on 100 parts by mass of all monomers, and 0.5 mol of TMEDA was added based on 1 mol of n-butyllithium.

As a first step, a cyclohexane solution containing 10 parts by mass of styrene (a monomer concentration of 22 mass %) was introduced over 6 minutes, and then a reaction was carried out for 20 minutes (the temperature was controlled to 70° C. during polymerization). At this point, the polymer solution was sampled, and the measured polymerization conversion of styrene was 100%.

Next, as a second step, a cyclohexane solution containing 20 parts by mass of butadiene (a monomer concentration of 22 mass %) was introduced over 10 minutes, and then a reaction was carried out for 20 minutes (the temperature was controlled to 70° C. during polymerization). At this point, the polymer solution was sampled, and the measured polymerization conversion of styrene/butadiene was 100%.

Next, as a third step, a cyclohexane solution containing 35 parts by mass of styrene and 25 parts by mass of butadiene (a monomer concentration of 22 mass %) was continuously introduced into the reactor at a constant rate over 45 minutes, and then a reaction was carried out for 30 minutes (the temperature was controlled to 70° C. during polymerization). At this point, the polymer solution was sampled, and the measured polymerization conversion of styrene/butadiene was 100%.

Next, as a fourth step, a cyclohexane solution containing 10 parts by mass of styrene (a monomer concentration of 22 mass %) was introduced over about 6 minutes, and then a reaction was carried out for 20 minutes (the temperature was controlled to 70° C. during polymerization). At this point, the polymer solution was sampled, and the measured polymerization conversion of styrene was 100%.

Next, 100 ppm of the above hydrogenation catalyst in terms of titanium was added to the resulting copolymer based on 100 parts by mass of the polymer, and a hydrogenation reaction was carried out under a hydrogen pressure of 0.7 MPa at a temperature of 70° C. Thereafter, methanol was added and, next, 0.3 parts by mass of octadecyl-3-(3, 5-di-t-butyl-4-hydroxyphenyl)propionate was added as a stabilizer based on 100 parts by mass of the polymer to obtain (polymer 14). The resulting (polymer 14) had a styrene content of 55.0 mass %, a block A content of 20.0 mass %, an amount of vinyl bonds of the butadiene block portion of 30.5 mass % before hydrogenation, a weight average molecular weight of 158,000, a degree of hydrogenation of 98%, an MFR (a temperature of 230° C., a load of 2.16 kg) of 4.3 g/10 min, and 2 loss tangent peak tops at 45.2° C. and 20.1° C.

Tables 1 and 2 below show the results of measuring the compositions, structures, molecular weights, and similar features of the resulting hydrogenated copolymers (polymers 1 to 14).

TABLE 1

|  |  | Polymer 1 | Polymer 2 | Polymer 3 | Polymer 4 | Polymer 5 | Polymer 6 | Polymer 7 |
| --- | --- | --- | --- | --- | --- | --- | --- | --- |
| Corresponding copolymer of the present embodiment |  | (1) | (1) | (1) | (1) | — | (1) | (1) |
| Block A (polystyrene block) | [Mass %] | 15 | 20 | 8 | 15 | 15 | 15 | 15 |
| Block B (hydrogenated conjugated diene block) | [Mass %] | 85 | 80 | 92 | 85 | 85 | 85 | 85 |
| Block C (hydrogenated copolymer block) | [Mass %] | — | — | — | — | — | — | — |
| Amount of vinyl bonds | [%] | 75.2 | 60.0 | 90.0 | 75.2 | 47.0 | 75.2 | 75.2 |
| Degree of hydrogenation of conjugated diene | [mol %] | 98 | 90 | 98 | 98 | 98 | 98 | 60 |
| Styrene content | [Mass %] | 15.0 | 20.0 | 8.0 | 15.0 | 15.0 | 15.0 | 15.0 |
| MFR (a temperature of 230° C., a load of 2.16 kg) | [g/10 min] | 7.0 | 5.1 | 5.3 | 7.0 | 7.0 | 0.5 | 15.0 |
| Weight average molecular weight | [×10,000] | 16.7 | 12.2 | 19.9 | 14.7 | 16.7 | 20.0 | 16.7 |
| Weight average molecular weight before coupling | [×10,000] | — | — | — | — | — | — | — |
| Loss tangent peak (range: −70° C. to 50° C.) | [° C.] | −24.2 | −46.9 | −20.0 | −24.2 | −30.5 | −24.0 | −30.2 |
|  |  | — | — | — | — | — | — | — |

TABLE 2

|  |  | Polymer 8 | Polymer 9 | Polymer 10 | Polymer 11 | Polymer 12 | Polymer 13 | Polymer 14 |
| --- | --- | --- | --- | --- | --- | --- | --- | --- |
| Corresponding copolymer of the present embodiment |  | (2) | (2), (3) | (2) | (2) | — | (2) | (2) |
| Block A (polystyrene block) | [Mass %] | 10 | 10 | 25 | 7 | 10 | 10 | 20 |
| Block B (hydrogenated conjugated diene block) | [Mass %] | — | — | — | — | — | — | 20 |
| Block C (hydrogenated copolymer block) | [Mass %] | 90 | 90 | 75 | 93 | 90 | 90 | 60 |
| Amount of vinyl bonds | [%] | 26.0 | 29.0 | 40.0 | 20.0 | 26.0 | 55.0 | 30.5 |
| Degree of hydrogenation of conjugated diene | [mol %] | 98 | 98 | 93 | 98 | 53 | 98 | 98 |
| Styrene content | [Mass %] | 52.0 | 67.0 | 40.0 | 75.0 | 52.0 | 23.5 | 55.0 |
| MFR (a temperature of 230° C., a load of 2.16 kg) | [g/10 min] | 4.5 | 6.0 | 6.8 | 9.9 | 4.5 | 4.9 | 4.3 |
| Weight average molecular weight | [×10,000] | 16.3 | 19.0 | 13.6 | 13.8 | 16.3 | 14.7 | 15.8 |
| Weight average molecular weight before coupling | [×10,000] | — | 9.5 | — | — | — | — | — |

TABLE 2-continued

|  |  | Polymer 8 | Polymer 9 | Polymer 10 | Polymer 11 | Polymer 12 | Polymer 13 | Polymer 14 |
|---|---|---|---|---|---|---|---|---|
| Loss tangent peak (range: −70° C. to 50° C.) | [° C.] | −12.8 | 22.5 | −33.1 | 38.5 | −13.8 | −34.7 | −45.2 / 20.1 |

Examples 1 to 16 and Comparative Examples 1 to 5

Polyethylene (manufactured by Asahi Kasei Chemicals Corporation, trade name "Creolex T5070L", MFR (190° C., 2.16 kg load)=7.0 g/10 min) for the substrate layer and the above hydrogenated block copolymer (1), hydrogenated copolymer (2), and hydrogenated copolymer (3) for the tackifier layer were blended in proportions indicated in Tables 3 and 4 and supplied to an extruder, and both layers were integrated and coextruded by T-die coextrusion to prepare surface protection films having a substrate layer thickness of 40 μm and a tackifier layer thickness of 15 μm. In order to evaluate the performance of the surface protection films obtained in Examples 1 to 16 and Comparative Examples 1 to 5, the bonding strength (initial bonding strength, bonding strength after thermal tack promotion), adhesion, and adhesive residue were measured/evaluated. Results thereof are shown in Tables 3 and 4. The tackifier in the tables is a tackifier under the trade name of "Clearon P125" manufactured by Yasuhara Chemical Co., Ltd.

TABLE 3

| | | | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|---|---|
| Formulation | Copolymer (1) | Polymer 1 | [Mass %] | 70 | 30 | 70 | 30 | 10 | 90 | | | | | | 63 |
| | | Polymer 2 | | | | | | | | 60 | | 80 | | | |
| | | Polymer 3 | | | | | | | | | 40 | | 80 | | |
| | | Polymer 4 | | | | | | | | | | | | 70 | |
| | | Polymer 5 | | | | | | | | | | | | | |
| | | Polymer 6 | | | | | | | | | | | | | |
| | | Polymer 7 | | | | | | | | | | | | | |
| | Copolymer (2), (3) | Polymer 8 | | 30 | 70 | | | | | 40 | 60 | | | 30 | 27 |
| | | Polymer 9 | | | | 30 | 70 | | | | | | | | |
| | | Polymer 10 | | | | | | 90 | | | | 20 | | | |
| | | Polymer 11 | | | | | | 10 | | | | | 20 | | |
| | | Polymer 12 | | | | | | | | | | | | | |
| | | Polymer 13 | | | | | | | | | | | | | |
| | | Polymer 14 | | | | | | | | | | | | | |
| | Tackifier | Clearon P125 | | | | | | | | | | | | | 10 |
| Performance | | Initial bonding strength | [g/25 mm] | 500 | 300 | 480 | 250 | 260 | 530 | 420 | 470 | 490 | 520 | 490 | 650 |
| | | Bonding strength after thermal tack promotion | [g/25 mm] | 850 | 510 | 790 | 390 | 505 | 980 | 715 | 805 | 880 | 935 | 810 | 1200 |
| | | Adhesion | | — | ◎ | ◎ | ◎ | ◎ | ◎ | ◎ | ◎ | ◎ | ◎ | ◎ | ◎ |
| | | Adhesive residue | | — | ○ | ○ | ○ | ○ | ○ | ○ | ○ | ○ | ○ | ○ | ○ |

TABLE 4

| | | | | Comparative Example 1 | Comparative Example 2 | Comparative Example 3 | Comparative Example 4 | Example 13 | Example 14 | Comparative Example 5 | Example 15 | Example 16 |
|---|---|---|---|---|---|---|---|---|---|---|---|---|
| Formulation | Copolymer (1) | Polymer 1 | [Mass %] | 100 | | | | | | 30 | 30 | 30 |
| | | Polymer 2 | | | | | | | | | | |
| | | Polymer 3 | | | | | | | | | | |
| | | Polymer 4 | | | | | | | | | | |
| | | Polymer 5 | | | | | | 70 | | | | |
| | | Polymer 6 | | | | | | | 70 | | | |
| | | Polymer 7 | | | | | | | | 70 | | |

TABLE 4-continued

|  |  |  | Comparative Example 1 | Comparative Example 2 | Comparative Example 3 | Comparative Example 4 | Example 13 | Example 14 | Comparative Example 5 | Example 15 | Example 16 |
|---|---|---|---|---|---|---|---|---|---|---|---|
| Copolymer (2), (3) | Polymer 8 |  |  | 100 |  |  | 30 | 30 | 30 |  |  |
|  | Polymer 9 |  |  |  | 100 |  |  |  |  |  |  |
|  | Polymer 10 |  |  |  |  |  |  |  |  |  |  |
|  | Polymer 11 |  |  |  |  |  |  |  |  |  |  |
|  | Polymer 12 |  |  |  |  |  |  |  |  | 70 |  |  |
|  | Polymer 13 |  |  |  |  |  |  |  |  |  | 70 |  |
|  | Polymer 14 |  |  |  |  |  |  |  |  |  |  | 70 |
| Tackifier | Clearon P125 |  |  |  |  |  |  |  |  |  |  |
| Performance | Initial bonding strength | [g/25 mm] | 550 | 150 | 130 | 490 | 450 | 450 | 330 | 270 | 260 |
|  | Bonding strength after thermal tack promotion | [g/25 mm] | 1200 | 320 | 280 | 1020 | 800 | 810 | 690 | 480 | 475 |
|  | Adhesion |  | — | ◎ | ◎ | ◎ | Δ | ◎ | ○ | Δ | ◎ | ○ |
|  | Adhesive residue |  | — | ○ | ○ | ○ | Δ | ○ | ○ | Δ | ○ | ○ |

As shown in Tables 3 and 4, Examples 1 to 16 all had sufficient initial bonding strength, did not have excessive bonding strength after thermal promotion, and demonstrated excellent adhesion. That is to say, Examples 1 to 16 were evaluated as having excellent adhesion to adherends, demonstrating practically good initial tack strength, being unlikely to undergo a change over time in bonding strength even when adhered for a long period of time, and being easily peelable at any time. Moreover, these Examples demonstrated excellent properties against adhesive residue.

On the other hand, Comparative Example 1 contained only polymer 1 and, therefore, although Comparative Example 1 had excellent initial adhesion, Comparative Example 1 developed excessive bonding strength due to thermal tack promotion and did not receive a practically good evaluation.

Comparative Examples 2 and 3 contained only polymers 8 and 9, respectively, and therefore had inferior bonding strength and did not receive a practically good evaluation.

Also, since the hydrogenated block copolymer (polymer 5) had a low vinyl content, Comparative Example 4 did not receive a practically good evaluation with respect to both adhesion and bonding strength after thermal tack promotion and, moreover, did not receive a good evaluation with respect to adhesive residue.

Example 13 received a practically good evaluation with respect to adhesion, initial bonding strength, bonding strength after thermal tack promotion, and adhesive residue, but since the hydrogenated block copolymer (polymer 6) had a high MFR (a temperature of 230° C., a load of 2.16 kg), Example 13 had such slightly inferior fabricability compared to other Examples that, for example, the thickness of each layer appeared irregularity during film formation, although its fabricability was not problematic for practical use.

Example 14 received a practically good evaluation with respect to adhesion, initial bonding strength, bonding strength after thermal tack promotion, and adhesive residue, but since the hydrogenated block copolymer (polymer 7) had a low degree of hydrogenation, Example 14 had inferior adhesion compared to other Examples. In addition, Example 14 had such slightly inferior fabricability compared to other Examples that, for example, the tacky layer showed gelation during film formation.

Furthermore, since the hydrogenated copolymer (polymer 12) had a low degree of hydrogenation, Comparative Example 5 did not receive a practically good evaluation with respect to both adhesion and adhesive residue and, moreover, did not receive a good evaluation with respect to adhesive residue.

Example 15 received a practically good evaluation with respect to adhesion, initial bonding strength, bonding strength after thermal tack promotion, and adhesive residue, but since the hydrogenated copolymer (polymer 13) had a low vinyl content, Example 15 had slightly inferior bonding strength after thermal tack promotion compared to Example 2 although its bonding strength after thermal tack promotion was not problematic for practical use.

Example 16 received a practically good evaluation with respect to adhesion, initial bonding strength, bonding strength after thermal tack promotion, and adhesive residue, but since the hydrogenated copolymer (polymer 14) had 2 loss tangent peak tops within a predetermined range, Example 16 had slightly inferior adhesion and bonding strength after thermal tack promotion compared to Example 2 although its adhesion and bonding strength after thermal tack promotion were not problematic for practical use.

The present application is based on a Japanese patent application (Japanese Patent Application No. 2014-79719) filed with the Japan Patent Office on Apr. 8, 2014, the content of which is incorporated herein by reference.

INDUSTRIAL APPLICABILITY

The tacky composition and the surface protection film provided therewith of the present invention have an appropriate level of initial tackiness to adherends and, even when placed in a severe thermal environment, are unlikely to develop increased adhesion, and the surface protection film can be easily peeled off from adherends, and do not soil the adherend surface, for example, by leaving an adhesive residue or fogging the surface. The surface protection film can be temporarily applied to the surfaces of synthetic resin plates, metal plates, decorative plywood, coated steel sheet, various nameplates, and the like to prevent scratches and staining during processing on such adherends as well as during transportation and storage thereof.

The invention claimed is:

1. A surface protection film comprising:
   a substrate film, and
   a tackifier layer comprising a composition comprising:
   a hydrogenated block copolymer (1) comprising a block A mainly comprising a vinyl aromatic compound monomer unit and a block B mainly comprising a conjugated diene monomer unit, wherein the conjugated diene monomer unit has an amount of vinyl bonds of 50% or more before hydrogenation; and
   a hydrogenated copolymer (2)
   (i) comprising a block C randomly comprising a vinyl aromatic compound monomer unit and a conjugated diene monomer unit,
   (ii) having a content of the vinyl aromatic compound monomer unit of 40 mass % or more,
   (iii) having a degree of hydrogenation of double bonds based on the conjugated diene monomer unit of 90% or more, and
   (iv) excluding a block mainly comprising a conjugated diene monomer unit,
   wherein a mass ratio of the hydrogenated block copolymer (1) to the hydrogenated copolymer (2) is 95:5 to 15:85.

2. The surface protection film according to claim 1, wherein
   the hydrogenated block copolymer (1) has a content of the vinyl aromatic compound monomer unit of 5 to 30 mass %, and
   the hydrogenated copolymer (2) has a content of the vinyl aromatic compound monomer unit of 40 to 80 mass %.

3. The surface protection film according to claim 1, wherein the hydrogenated block copolymer (1) has a degree of hydrogenation of double bonds based on the conjugated diene monomer unit of 90% or more.

4. The surface protection film according to claim 1, wherein the hydrogenated copolymer (2) has a degree of hydrogenation of double bonds based on the conjugated diene monomer unit of 93% or more.

5. The surface protection film according to claim 1, wherein the hydrogenated block copolymer (1) has a melt flow rate (g/10 min) of 1.0 to 30 at a temperature of 230° C. under a load of 2.16 kg.

6. The surface protection film according to claim 1, wherein the hydrogenated copolymer (2) further comprises a block A mainly comprising a vinyl aromatic compound monomer unit.

7. The surface protection film according to claim 6, wherein the hydrogenated copolymer (2) has a block A content of 5.0 to 30 mass %.

8. The surface protection film according to claim 1, wherein the conjugated diene monomer unit of the hydrogenated copolymer (2) has an amount of vinyl bonds of less than 50% before hydrogenation.

9. The surface protection film according to claim 1, wherein the conjugated diene monomer unit of the hydrogenated copolymer (2) has an amount of vinyl bonds of 20% or more and less than 50% before hydrogenation.

10. The surface protection film according to claim 1, wherein the hydrogenated copolymer (2) has only one loss tangent peak top in a range of −70 to 50° C. in a dynamic viscoelasticity spectrum.

11. The surface protection film according to claim 1, wherein the hydrogenated block copolymer (1) has a weight average molecular weight of more than 100,000.

12. The surface protection film according to claim 1, further comprising a hydrogenated copolymer (3) having a weight average molecular weight 0.30 to 0.70 times that of the hydrogenated copolymer (2).

13. The surface protection film according to claim 12, wherein a conjugated diene monomer unit of the hydrogenated copolymer (3) has an amount of vinyl bonds of less than 50% before hydrogenation.

14. The surface protection film according to claim 2, wherein the hydrogenated block copolymer (1) has a degree of hydrogenation of double bonds based on the conjugated diene monomer unit of 90% or more.

15. The surface protection film according to 3, wherein the hydrogenated copolymer (2) has a degree of hydrogenation of double bonds based on the conjugated diene monomer unit of 93% or more.

16. The surface protection film according to claim 1, wherein a thickness of the tackifier layer is 1.0 μm or more and 100 μm or less.

* * * * *